Nov. 28, 1944.     J. C. PATRICK     2,363,614

POLYSULPHIDE COPOLYMERS

Filed April 12, 1939

INVENTOR
Joseph C Patrick.
BY Gifford, Scull, Burgess
ATTORNEY

UNITED STATES PATENT OFFICE 2,363,614

POLYSULPHIDE COPOLYMERS

Joseph C. Patrick, Morrisville, Pa., assignor to Thiokol Corporation, Trenton, N. J., a corporation of Delaware Application April 12, 1939, Serial No. 267,389

35 Claims. (Cl. 260—79)

This invention relates to the production of polymeric and/or plastic substances of the polysulphide type and is a continuation-in-part of my copending application Ser. No. 168,522, filed October 11, 1937, which in turn is a continuation-in-part of application 109,675, filed November 7, 1936, and 122,805, filed January 28, 1937.

The reaction of alkaline polysulphides with poly functional organic compounds, e. g., compounds having at least one substituent on each of two or more different carbon atoms, which substituent is split off during the reaction, produces polymers having the general formula $$HS.[RS_x]_n.R.SH$$

where R is an organic radical having the skeleton structure

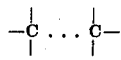

(where the carbon atoms are separated by intervening structure) or

(where the carbon atoms are adjacent). In view of the very large value of $n$, the formula may be written substantially as $[RS_x]_n$, $x$ varying from about 2 to about 6.

These polymers possess great utility and are used for such purposes as binders for transmission belts, linings for propane and butane gas hose, hose for paint spray equipment, high pressure grease-gun hose, linings for hose to convey gasoline, oil, etc., pump pistons and cups in oil slush pumps, protective jackets for high tension wire and portable cable, printing rollers and blankets for newspaper printing, gaskets, washers, packing in all industries, covers for conveyor belting, balloon fabric, diaphragms for controllers, regulators and meters, binder and adhesives for use with leather, cork and felts, seals for prevention of refrigerant leakage, gloves for chemical plants and paint factories, printing plates for use with inks, paints, etc., packings for compressors, many specialty molded products, protective liners and lining means for tanks, etc., such as those used in refineries and in dry cleaning equipment, and numerous other uses.

Such polymers may be formed by various reactions, e. g., by the polysulphide reaction or by the mercapto reaction. The mechanism of the former is set forth in detail, e. g., in Patrick Patent 2,142,144, January 3, 1939, and copending application 218,874, filed July 2, 1938, now United States Patent 2,216,044, September 24, 1940, and the latter in Patrick Patent 2,142,145, January 3, 1939. For ease of reference there is appended hereto a drawing or diagram showing the mechanism of the polysulphide reaction in which Fig. 1 shows reaction between sodium polysulphide and a compound having substituents X and $X_1$ joined respectively to two different carbon atoms (which carbon atoms are separated by and joined to intervening structure) with the result that the substituent $X_1$ is split off, combined with one of the sodium atoms of the sodium polysulphide and converted into a salt, $NaX_1$. The result of this reaction is the formation of a compound in which the radical —$S_4Na$ is substituted for the substituent $X_1$.

The organic compound formed as shown in Fig. 1 is bifunctional and is capable of self union as shown in Fig. 2. Fig. 2 shows the formation of a polymeric compound of low molecular weight, having a sodium terminal at one end and a substituent X at the other end.

Figure 5:
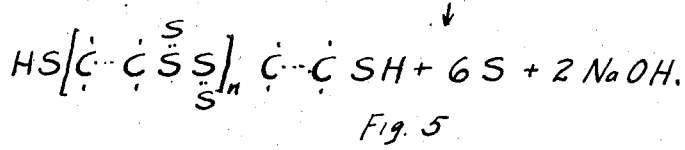
Figure 6:
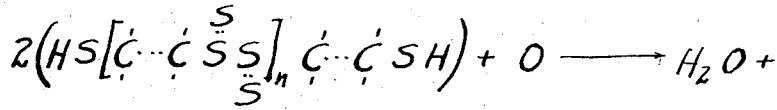
Figure 6:
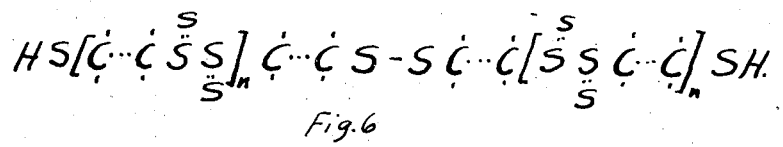

In some cases it may be desirable to increase still further the molecular size of the polymer shown in Fig. 5 and this may be done by the method of oxidation shown in Fig. 6.

The general mechanics of the reaction is the same whether the carbon atoms (to which the replaceable substituents are joined) are adjacent or separated by intervening structure and whether the said carbon atoms are in a aromatic nucleus or a part of an alkyl or aralkyl grouping. Usually higher temperatures are necessary to dislodge the substituents X and $X_1$ when they are joined to a nuclear carbon atom than otherwise.

The equations shown in the drawing illustrate the production of a polymer having the formula $(RS_4)_n$ since an alkaline tetrasulphide is the sulphurizing reactant used. By using alkaline di, tri-, penta or hexasulphides the atomic proportion of sulphur in the formula changes and the general formula of the polymer is $(RS_x)_n$ where the $x$ is an integer of about 2 to 6.

The organic compound used has the general formula $XRX_1$, where R has the definition above given and X and $X_1$ are substituents split off during the reaction, e. g., halogen, formate, acetate, propionate, etc., acid carbonate, nitrate, acid sulphate, acid phosphate, acid oxalate, acid malate, acid succinate, acid tartrate, etc.

The polymers of the general formula $(RS_x)_n$ may be produced not only by the alkaline polysulphide reaction but also by the mercaptan reaction as described in my Patent 2,142,145, January 3, 1939, and also by the thiosulphate reaction which will be described below and is further described in my copending application 131,367, filed March 17, 1937.

The properties of said polymers vary widely, depending on the organic radical R and the value of $x$, i. e., whether the polymer is of the disulphide type where $x=$about 2 or of the type where $x=$about 3 to 6.

Nevertheless, in any given polymer the properties are dominated by the nature of the radical R and notwithstanding the wide variety of radicals R available in their compounds, the precise properties necessary to meet certain needs may be difficult or impossible of attainment.

It has been found possible to produce polymers having the general formula $[(RS_x)_m—(R'S_x)_n]$.

In such polymers not only are different radicals R and R' chemically combined together in the same molecule but also the ratio of these radicals may be controlled. Such polymers may be referred to as "mixed" polymers, using "mixed" in the chemical sense. Such polymers are quite different from those obtained by separately making an $(RS_x)$ polymer and an $(R'S_x)$ polymer and merely physically mixing the two polymers thus produced. It is perhaps preferable to refer to such polymers as copolymers.

In accordance with the present invention the polymers $(RS_x)_m$ and $(R'S_x)_n$ may be produced together or separately, but in any event they are chemically combined.

Briefly, while the polymers $(RS_x)$ and $(R'S_x)$ individually possess great utility, I am enabled by the marriage or reaction of these polymers to develop entirely new properties and to open up new fields of utility.

The mixed polymers may be produced by various reactions, some of which are listed below as follows:

A. Reaction of an $XRX_1$ compound with an alkaline polysulphide to form an $(RS_{2 \text{ to } 6})$ polymer in reactive dispersed condition, addition of more alkaline polysulphide to the dispersion, if necessary, reaction of this with an $XR'X_1$ compound to form an $(R'S_{2 \text{ to } 6})$ polymer and coupling of said polymers. The polymer so produced has substantially the formula

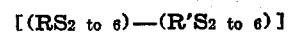

and may be reduced or desulphurized, if desired, to remove the labile sulphur and obtain a polymer having substantially the formula

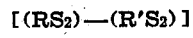

This will be illustrated by the following example. In this example, specifically, ethylene dichloride is reacted with sodium tetrasulphide to form a polymer, more alkaline polysulphide is added and reacted with dichlorethyl ether to form a second polymer and the two polymers are coupled.

EXAMPLE 1

Figure 1:
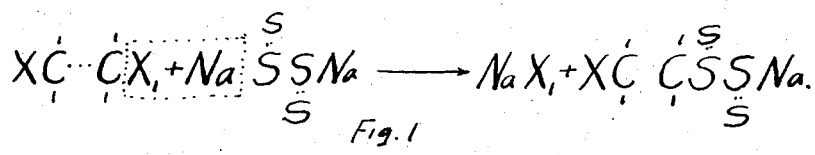
Figure 2:
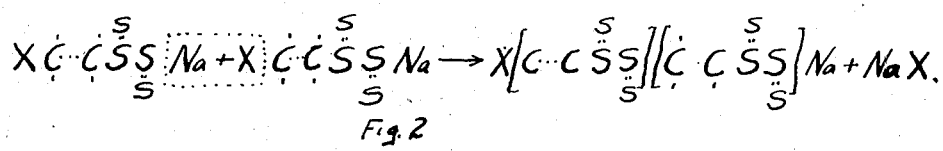
Figure 3:
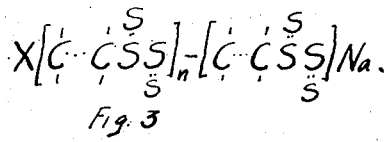
Fig. 3 shows the formation of a high molecular weight polymer by the polymerization of the compound shown in Fig. 2. The polymer shown in Fig. 3, while of high molecular weight, still has a sodium terminal at one end and a substituent X at the other.
Figure 4:
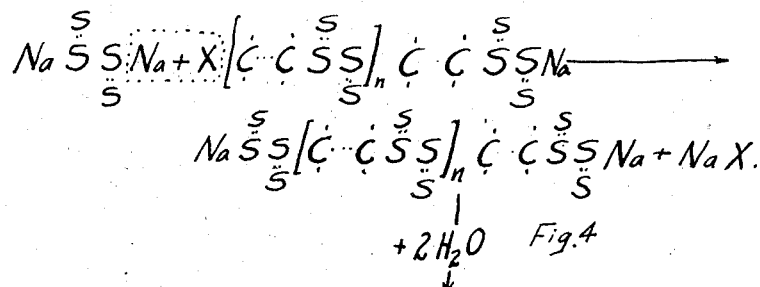
Figs. 4 and 5 show the manner in which the sodium and X substituent terminals of the compound shown in Fig. 3 are converted into SH terminals.

6050 gram mols of sodium tetrasulphide in the form of a 2 molar solution thereof are treated with 8 kilograms of NaOH followed by 20 kilograms of $MgCl_2.6H_2O$ in a reaction vessel provided with coils for heating and cooling and an agitator. 6000 gram mols of ethylene dichloride are added during about three hours and the temperature maintained at about 160° F. during this time. Then the temperature is raised to about 200° F. and held there about an hour with agitation. The reaction product is a polysulphide polymer in the form of a latex-like liquid of such character that it can be washed and settled out from the washing water. At this point the polymer is at approximately the stage represented by Fig. 5 in the accompanying drawing and is in the form of a latex. Approximately 6000 mols of the polysulphide were required to convert the ethylene dichloride to the polymeric stage shown by Fig. 3 and the excess of about 50 gram mols of sodium tetrasulphide sufficed to convert the polymer from that stage to the stage shown in Fig. 5. This latex-like dispersion is of such a nature that the specific gravity of the particles is greater than 1. Therefore, the latex particles are readily separated from the dispersion by settling therefrom to form a dense, latex-like liquid. The supernatant aqueous solution of salts which are by-products of reaction is then removed by suitable means and the latex is purified by rapid agitation with water followed by settling.

The next step is the production of a different type of polymer by reaction of sodium tetrasulphide with dichlorethyl ether and this polymer is coupled with that formed from the ethylene dichloride. These steps may be carried out as follows:

To the latex containing the ethylene tetrasulphide polymer, there is added about 2020 gram mols of sodium tetrasulphide in the form a 2 molar solution thereof. The temperature of the mixture of latex and polysulphide is adjusted to 140 F. and suitably agitated. To the mixture are added 2000 gram mols of BB' dichlorethyl ether. The temperature will rise as the ether is gradually added to the mix and said temperature should be controlled in such a manner that it does not rise above about 180° F. during the addition of the dichloro ether. The dichloro ether should be added at such a rate that from two to three hours are required to get it all into the reaction. After this has been done the temperature should be raised to about 200° F. and maintained at that temperature for about two hours to thoroughly complete the reaction. The reaction which has just been described causes the formation of a polysulphide polymer from the dichlorethyl ether and the formation of this polymer occurs substantially concurrently with its coupling with the polymer formed from the ethylene dichloride. The resulting copolymer is washed and purified as above described in the case of the ethylene tetrasulphide polymer.

If it is desired to coagulate the dispersed copolymer, the latex may be treated with acid until the pH is about 4 to 5, whereupon the polymer separates out and may be washed with water to free it from traces of acid.

In the above reaction the sodium tetrasulphide which is added just prior to the addition of the dichlorethyl ether reacts with the latter as set forth in Figs. 1 to 5 of the accompanying drawing and produces a polymer having substantially the skeleton structure shown in Fig. 5. There are then two polymers having the same skeleton structure illustrated in Fig. 5 but different specific structure by virtue of the difference in compounds used to produce these polymers. The said polymers combine substantially according to the following equation:

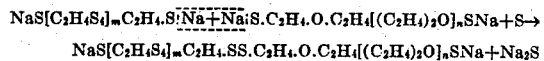

The source of the sulphur for this condensation is the alkaline polysulphide.

B. Modification of A. An $XRX_1$ compound is reacted with alkaline polysulphide to form an $(RS_{3\ to\ 6})$ polymer. This is treated with a desulphurizing agent which in the process of desulphurizing is converted into (oxidized) alkaline polysulphide, the $(RS_{3\ to\ 6})$ polymer being simultaneously reduced or desulphurized to form an $(RS_2)$ polymer. An $XR'X$ compound is then added and reacted whereby an $(R'S_{3\ to\ 6})$ polymer is formed and coupled with the $(RS_2)$ polymer. The result is a polymer having the formula $$[(RS_2)_m\text{---}(R'S_{3\ to\ 6})_n]$$

This may or may not be treated with a desulphurizing agent to produce a polymer having the formula

This will be illustrated by the following example:

EXAMPLE 2

*Preparation of a disulphide polymer by partially desulphurizing a tetrasulphide polymer and coupling of the disulphide polymer*

3000 liters of a 2 molar sodium tetrasulphide solution containing 6000 gram mols of $Na_2S_4$ are treated with 8 kilograms of NaOH followed by 20 kilograms of $MgCl_2 \cdot 6H_2O$. in a reaction vessel as in Example 1. 6000 gram mols of BB' dichlorethyl ether are slowly added during about 3 hours and the temperature is maintained at about 160° F. with stirring, after which the temperature is raised to 200° F. and held there about 2 hours with agtation. The polymer formed is in the form of a latex which is settled out. The supernatant liquor is drawn off and the volume restored by adding water. Then add 6000 gram mols of NaOH and heat to about 200° F. with constant agitation and hold there about 30 minutes to effect a partial desulphurization and to activate the polymer by converting all —SH groups into —SNa groups. Then cool down to about 130° F. and add 2000 gram mols of ethylene dichloride during about half an hour, with stirring. Then raise temperature to about 200° F. and maintain there about half an hour. The product is now a coupled polymer, still in the form of a latex which is settled out from the supernatant liquor which is drawn off. The residual latex is washed twice with water with intermediate settling and drawing off of the wash water.

The resulting coupled polymer contains both disulphide and tetrasulphide groups of sulphur atoms and is subjected to a further desulphurizing treatment to complete the conversion of the organic polysulphide to the disulphide. It has been found advantageous to effect a partial desulphurizing prior to coupling, followed by a completion of the desulphurizing subsequent to coupling. The completion of the desulphurizing may be carried out by a treatment with sodium monosulphide as follows:

1000 gram mols of sodium monosulphide are added to the latex, the temperature is raised to about 200° F. and held there about an hour. The coupled polymer is still in the form of a latex. It is settled, washed free from color by successive washings drawn off into a separate vessel and coagulated by adding acid as in Example 1.

The coupling of the polymers may occur at various stages of the polymerization of the respective polymers, as for example the stages shown in Figs. 2 to 6 of the accompanying drawing. There may also be a combination of one polymer with the monomeric substance which produces the other polymer. In view of the high molecular weight of the polymers and low molecular weight of the monomeric substance, the mass of the latter combined, as such, with a polymer is very low except when the polymer is at a low stage of polymerization.

C. A mixture of an $XRX_1$ compound and an $XR'X_1$ compound is reacted with an alkaline polysulphide, with or without subsequent desulphurization.

See Example 7 below, omitting the final desulphurizing step or not, as desired.

The type of reaction above shown under C produces a product which is different from the product produced by the type of reaction described above under A, even though precisely the same organic compounds should be employed in precisely the same proportion, the reason for this being that the molecular "pattern" or the sequence of the different units in the chain molecule are different, depending upon the method of production. For example, where the second condensation polymer is formed in the presence of the first reaction product, which has never been heated or purified, the state of polymerization of the first reaction product is usually considerably lower, that is to say, the molecular weight is less than it would be if it had been heated and purified. Therefore, when the second reaction is carried out in the presence of this relatively low molecular weight, already formed, polymer, a very great opportunity for inter-reaction between the polymer in process of formation with the already formed but not highly polymerized product is presented, with the result that a much greater degree of "randomness" is introduced into the molecular pattern than is the case where the reaction is carried out as described under A.

D. An $(RS_{2\ to\ 6})$ polymer is produced in reactive dispersed form and an $(R'S_{2\ to\ 6})$ polymer is separately produced in reactive dispersed form. The respective dispersions are then mixed and reacted. The separately produced polymers have the formulae $HS(RS_4)_mRSH$ and $$HS(R'S_4)_nR'SH$$

and they react substantially as follows in the presence of an oxidizing agent.

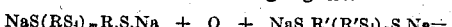
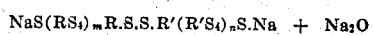

The condensing agent is one such as sulphur or oxygen, capable of uniting with the sodium terminals, $m$ and $n$ are integers signifying the ratio of the radicals $RS_4$ and $R'S_4$ in the molecules, this ratio being predetermined by the mols of organic compounds used to make the respective polymers.

Example 3

6 mols of sodium tetrasulphide in the form of a 2 molar solution are placed in a reaction flask equipped with stirring means and reflux condenser. 8 grams of sodium hydroxide are added thereto, followed by 20 grams of magnesium chloride $MgCl_2 \cdot 6H_2O$. The mixture is heated to a temperature of 140° F. and 4 mols of 1,2,3 trichlor propane are added slowly to the polysulphide mixture and the temperature is gradually increased until it reaches about 190° F. at which it is controlled by suitable cooling means during the remainder of the addition of the organic reactant. After all of the trichlor hydrin is into the reaction the temperature is slowly raised over a period of about one-half hour to about 215° F. at which it is held for two hours to complete the reaction. A coarse, latex-like dispersion of the polysulphide polymer is thereby produced. The agitation is stopped and the polymer is allowed to settle out of the aqueous salt solution which remains. The supernatant liquid is removed and the polymer is washed by repeated settling and decantation with fresh water.

6 mols of sodium tetrasulphide in the form of a 2 molar solution are placed in a reaction flask equipped with stirring means and reflux condenser. 8 grams of sodium hydroxide are added thereto, followed by 20 grams of magnesium chloride $MgCl_2.6H_2O$. The mixture is heated to a temperature of 140° F. and 5 mols of dichlor methyl acetal $$Cl.C_2H_4O.\overset{\overset{\displaystyle CH_3}{|}}{\underset{\underset{\displaystyle H}{|}}{C}}.O.C_2H_4Cl.$$

is added. The temperature of the reaction is such that as the chloro acetal is added, the heat of the mixture increases. As the temperature reaches about 170° F. it should be controlled by suitable cooling means at this temperature, until all of the dichloro acetal is into the reaction, after which the temperature is raised to 200° F. and held at that temperature for a period of about one hour. The condensation polymer so formed is in the form of a latex and is purified as described above.

The two latices are combined in a single reaction vessel and about 10 grams of sodium hydroxide are added to the mixture. The latices as formed above conform to the type shown in Fig. 5 of the drawing, the addition of the caustic soda being to ensure the presence of sodium terminals (SNa). The union of these polymers is brought about by any suitable oxidation means. For example, I may heat the mixture to a temperature of about 200° F. while passing through the suspension a current of air for about two hours, or, as an alternative method I may add about two mols of sodium tetrasulphide in the form of a two molar solution and heat the mixed lattices to about 180 to 200° F. for about an hour in the presence of the excess of polysulphide, thereby bringing about chemical union between the two different types of condensation polymer to form a complex molecular pattern. Instead of polysulphide or atmospheric oxygen I may use any of the following oxidizing agents:

Hydrogen peroxide
Sodium perborate
Sodium hypochlorite
Benzoyl peroxide

E. An $(RS_2)$ polymer is made by oxidizing an $XRX_1$ compound (where X and $X_1$ are SH groups). Another dimercapto compound is then added and oxidized to form an $(R'S_2)$ polymer and the latter is coupled with the $(RS_2)$ polymer to make a copolymer.

Example 4

4 mols of tri methylene dimercaptan $HS.CH_2.CH_2.CH_2.SH$ are dispersed in 1 liter of water. 20 grams of magnesium chloride $MgCl_2.6H_2O$ are dissolved in about 50 cubic centimeters of water and added to the above dispersion. 40 grams of sodium hydroxide are dissolved in about 100 cubic centimeters of water and this also is added to the dispersion. The mixture is heated to a temperature of about 150° F. at which temperature a current of air is passed through the dispersion for about 15 minutes. This leads to the formation of a trimethylene condensation disulphide polymer in a relatively low state of polymerization. To this mixture are added 4 mols of 1,4 dimercapto butene-2 $HS.CH_2CH=CH.CH_2.SH$ with continuous agitation. A current of air is passed through and another 40 grams of caustic soda in about 100 cubic centimeters of water are added slowly. The temperature is then raised to about 200 to 210° F. and the current of air is continued for about two hours at this temperature. At the end of the heating period the agitation is discontinued and the condensation co-polymer, which is in the form of a latex, is allowed to settle out of the aqueous liquid. The supernatant liquid is then removed and the latex is washed by repeated treatment with water, settling and decantation. The polymer in the latex thus produced may be separated in the form of a coagulum as shown in previous examples.

It should be noted that no odor of either of the mercaptans used is present in the finished product.

F. A mixture of $XRX_1$ and $XR'X_1$ compounds (X and $X_1$ being SH groups) is oxidized and a polymer having the formula $(RS_2)_m$—$(R'S_2)_n$ is produced.

Example 5

1 mol of 1,3 dimercapto iso-butane is mixed with 4 mols of ethylene dimercaptan and the mixture of mercaptans is dispersed in 2 liters of water in a flask fitted with an agitator. 20 grams of $MgCl_2.6H_2O$ is dissolved in 50 cubic centimeters of water and added, followed by 80 grams of sodium hydroxide dissolved in 150 cubic centimeters of water. The mixture is heated with constant agitation to about 200° F. and a current of air is passed through the mixture for two hours at this temperature. The condensation polymer so formed is in the form of a latex and is purified by washing with water and decantation, as hereinbefore described. It may be coagulated as in previous examples.

G. Modification of F. A mixture of $XRX_1$ and $XR'X_1$ compounds (X and $X_1$) being substituents capable of being converted into SH groups, e. g., by reaction with an alkaline hydrosulphide. is reacted with an alkaline hydrosulphide and the product is oxidized.

2200 cc. of a 2 molar NaSH solution containing 4.4 mols NaSH is reacted with 1 gram mol of BB' dichlor ethyl ether and 1 gram mol of ethylene dichloride in the presence of a magnesium hydroxide dispersing agent at a temperature of about 200° F. for about 2 hours. The resulting solution of mixed mercaptides is then oxidized in the manner herein set forth. See F (Example 5) above.

Another procedure based upon the use of the hydrosulphide reaction may be illustrated as follows:

430 grams of dichloroethyl ether are caused to react with one liter of a 50% alcoholic solution containing about 150 grams of sodium hydrosulphide. The mixture is agitated and is gradually heated to a temperature of about 80° C. and is kept at this temperature until the odor of ether has practically disappeared, which usually takes about two hours.

A dispersion agent, which is preferably freshly formed $Mg(OH)_2$ is added to the reaction mixture. It may be formed by causing 50 grams of crystallized magnesium chloride dissolved in 200 cubic centimeters of water to be decomposed by adding about 20 grams of sodium hydroxide, NaOH.

After the dispersing agent has been added, a liter of double molar sodium polysulphide is added. This sodium polysulphide is preferably a mixture of $Na_2S_4$ and $Na_2S_5$ in proportion to give approximately empirical formula $Na_2S_{4.5}$. The reacting materials are kept at a temperature of about 70° C. and agitation of the same is kept up for about two hours in order to cause condensation polymerization to produce the long chain polymeric disulphide.

The reaction mixture is then cooled to about 30° C. and 100 grams of ethylene dichloride are added, agitation is continued, and after the temperature has ceased to rise from the exothermic reaction, the mixture is heated to about 80° C. and is kept at about that temperature for approximately two hours. A latex-like dispersion is formed and is permitted to settle and the supernatant liquid is removed by decantation or in any other suitable way. When it is desired to remove any loosely combined or labile sulphur from the polymerized product, this may be done by agitating the latex with a solution of 50 grams of sodium hydroxide or an equivalent amount of sodium monosulphide at a temperature of about 85° C. for an hour. This step may be repeated where entire freedom from labile sulphur is desired.

The polymerized product may be freed from soluble impurities by washing it repeatedly with water and permitting settling and decantation at intervals.

The purified latex is white and fairly fine in texture. It can be coagulated by the addition of acids, such as hydrochloric acid, and forms a highly elastic mass that can be compounded with pigments and other compounding agents that are used in rubber compounding. It may also be compounded with natural and artificial rubbers and can be cured, whereupon it becomes very tough and abrasion resistant, somewhat analogous to the vulcanization of rubber, when the product is heated to about 145° C.

Instead of using sodium hydrosulphide, substantially equally satisfactory results are obtained by using the equivalent amount of potassium hydrosulphide, and instead of using sodium polysulphide for the condensation polymerization step, other polysulphides, such as potassium, calcium, barium and ammonium may be used. Also, instead of starting with dichloro ethyl ether, a large number of other compounds may be used. For example, about 560 grams of chloroethoxy chloroethyl ether may be used instead of 430 grams of the dichloro ether and the resulting compound is rubber-like and can be equally as readily compounded, pigmented and cured. The compound thus produced is uniquely resistant to low temperature, as shown by the fact that it remains flexible at temperatures as low as 45° below zero F. It has also been found that the bromides and iodides can be used in the process, instead of the chlorides with substantially equally desirable results.

Also, instead of using about 100 grams of ethylene dichloride in the above example, about 160 grams of dichloro hexane (hexamethylene dichloride) may be used with substantially the same results, except that the final rubber-like product is more resistant to the absorption of water.

H. A mixture of an $XRX_1$ compound and an $XR'X_1$ compound is reacted with an alkaline thiosulphate. The product is then reacted with an alkaline mono or polysulphide. This produces a mixture of $HS.R.SH$ and $HS.R'.SH$ bodies and this is oxidized to produce a $[(RS_2)-(R'S_2)]$ polymer. The mechanism of the thiosulphate reaction with an XRX compound is set forth in my copending application 131,367, filed March 17, 1937.

EXAMPLE 6

1 mol BB' dichloroethyl ether is dissolved in 1 mol of ethylene dichloride and the two mols of organic chlorides are then reacted with 5 mols of sodium thiosulphate dissolved in 2 liters of water in the presence of magnesium hydroxide derived from the inter-action of 20 grams $MgCl_2.6H_2O$ with 8 grams of NaOH. The reaction is carried out in a flask fitted with a stirrer and a reflux condenser. The initial temperature of the mix should be about 160° F. and this temperature is continued for about one hour, after which the temperature is slowly raised to about 220° F. with constant agitation. This latter temperature is maintained for a period of about five hours to ensure complete reaction of the organic halides with the thiosulphate. The aqueous solution of the mixed organic thiosulphates is then cooled. To 2 liters of a 2 molar solution of sodium monosulphide are added 8 grams of sodium hydroxide followed by 20 grams of $MgCl_2.6H_2O$ dissolved in about 60 cubic centimeters of water. This mixture is contained in a flask fitted with an agitator. The sodium sulphide solution is heated to a temperature of about 130° F. and with constant agitation the aqueous solution of the organic thiosulphates, as prepared above, is added in a thin stream. A latex-like dispersion of a disulphide copolymer containing ethylene and ether radicals is formed in this manner. The polymer so formed is usually in a low state of polymerization and it is preferable after its formation to treat the latex-like dispersion with about 40 grams of sodium hydroxide and to heat the latex to about 200° F. for about 15 minutes, after which the latex is permitted to settle, the supernatant liquid is withdrawn and the latex is purified as in the previous examples. It can be coagulated as in previous examples.

In all of the above reactions it will be observed that the radicals R and R' are obtained from compounds having the general formula $XRX_1$ and $XR'X_1$. Instead of the specific compounds mentioned in the above examples any of the compounds in the following tables may be substituted, care being taken to select compounds so that R and R' will be specifically different. For the mercaptan reaction X and $X_1$ are SH groups. Otherwise X and $X_1$ are substituents split off during the reaction (e. g., polysulphide or thiosulphate reaction) as hereinbefore set forth, i. e., halogens, acid sulphate, nitrate, formate, acetate, etc.

TABLE I
Polyfunctional hydrocarbons $X(CH_2)_nX_1$ n may be 1 to 20 or more $$CH_3.CH.CH.CH_3$$
$$\quad\ \ |\ \ \ |$$
$$\quad\ \ X\ \ X_1$$

2,3, disubstituted butane $$CH_3.CH.CH_2$$
$$\quad\ \ |\ \ \ |$$
$$\quad\ \ X\ \ X_1$$

2,3, disubstituted propane $$CH_3.CH_2.CH.CH_2.CH_2.CH_3$$
$$\qquad\qquad |\ \ \ \ \ \ \ |$$
$$\qquad\qquad X\ \ \ \ \ \ X_1$$

3,5, disubstituted heptane $$X.CH_2.CH.CH_2.X_1$$
$$\qquad\quad |$$
$$\qquad\quad CH_3$$

Disubstituted isobutane $$X.CH_2.CH.CH_2.X_1$$
$$\qquad\quad |$$
$$\qquad\quad CH_2$$
$$\qquad\quad |$$
$$\qquad\quad CH_3$$

Disubstituted isopentane

TABLE II
Polyfunctional compounds having an ether linkage $CH_3.CHX.O.CHX_1.CH_3$ AA' disubstituted ethyl ether $X.C_2H_4.O.C_2H_4.X_1$ BB' disubstituted ethyl ether $X.CH_2.O.CH_2.X_1$ Disubstituted methyl ether $X.C_2H_4O.C_2H_4.O.C_2H_4.X_1$ Disubstituted ethoxy ethyl ether $X.C_2H_4.S.C_2H_4.X_1$ Disubstituted thio ethyl ether $X.CH_2.S.CH_2.X_1$ Disubstituted thio methyl ether $$\qquad\qquad\quad CH_3$$
$$\qquad\qquad\quad |$$
$$X.CH_2.O.CH_2.C.CH_2.O CH_2.X_1$$
$$\qquad\qquad\quad |$$
$$\qquad\qquad\quad CH_3$$

Disubstituted 1, 3 methoxy, 2, 2 dimethyl propane $X.CH_2.CH_2.CH_2.O.CH_2.O.CH_2.CH_2.CH_2.X_1$ Disubstituted dipropyl formal $X.CH_2.CH_2.O.CH_2.O.CH_2.CH_2.X_1$ Disubstituted diethyl formal $$X.CH_2O.CH_2.CH.O CH_3$$
$$\qquad\qquad\quad |$$
$$\qquad\qquad\quad X_1$$

Disubstituted dimethoxy ethane

Disubstituted para diethoxy benzene $X.CH_2O.CH_2.CH_2.O CH_2.X_1$

Disubstituted dimethoxy ethane $X.CH_2.CH_2.CH_2.S.CH_2.CH_2.CH_2.X_1$

Disubstituted dipropyl thio ether

pp' Disubstituted diphenyl ether

Disubstituted anisole

Disubstituted dibenzyl ether

aa' Disubstituted diphenyl ether

Disubstituted parapropyl dibenzyl ether $X.CH_2.CH_2.SO_2.CH_2.CH_2.X_1$

Disubstituted diethyl sulphone $X.CH_2.CH_2.CH_2.SO_2.CH_2.CH_2.CH_2.X_1$

Disubstituted dipropyl sulphone $$CH_3.O.CH.CH_2.O.CH_2.CH_2.O.CH_2.CH_2.O.CH_2.CH.O.CH_3$$
$$\qquad\quad |\qquad\qquad\qquad\qquad\qquad\qquad\qquad\quad |$$
$$\qquad\quad X\qquad\qquad\qquad\qquad\qquad\qquad\qquad\ X_1$$

Disubstituted dimethoxy tetra ethylene glycol $$CH_3.CH_2.CH.O.CH.CH_2.CH_3$$
$$\qquad\qquad |\qquad\ |$$
$$\qquad\qquad X\quad\ X_1$$

AA' disubstituted propyl ether $$CH_2.CH_2.CH_2.O.CH_2.CH_2.CH_2$$
$$|\qquad\qquad\qquad\qquad\qquad\quad |$$
$$X\qquad\qquad\qquad\qquad\qquad\ X_1$$

Gamma gamma disubstituted propyl ether $$CH_3.CH.CH_2.O.CH_2.CH.CH_3$$
$$\quad\ \ |\qquad\qquad\qquad\ |$$
$$\quad\ \ X\qquad\qquad\qquad X_1$$

BB' disubstituted propyl ether $$CH_3.CH.CH_2.O.CH.CH_2.CH_3$$
$$\quad\ \ |\qquad\qquad\ |$$
$$\quad\ \ X\qquad\qquad X_1$$

Alpha beta disubstituted propyl ether $$CH_2.CH_2.CH_2.O.CH.CH_2.CH_3$$
$$|\qquad\qquad\qquad\ |$$
$$X\qquad\qquad\qquad X_1$$

Alpha gamma disubstituted propyl ether $$CH_3.CH_2.CH_2.CH.O.CH.CH_2.CH_2.CH_3$$
$$\qquad\qquad\quad |\qquad\ |$$
$$\qquad\qquad\quad X\quad\ X_1$$

Alpha alpha disubstituted butyl ether $$CH_3.CH_2.CH.CH_2.O.CH_2.CH.CH_2.CH_3$$
$$\qquad\quad |\qquad\qquad\qquad\ |$$
$$\qquad\quad X\qquad\qquad\qquad X_1$$

Beta beta disubstituted butyl ether $$CH_3.CH.CH_2.CH_2.O.CH_2.CH_2.CH.CH_3$$
$$\quad\ \ |\qquad\qquad\qquad\qquad\qquad\ |$$
$$\quad\ \ X\qquad\qquad\qquad\qquad\qquad X_1$$

Gamma gamma disubstituted butyl ether $$CH_2.CH_2.CH_2.CH_2.O.CH_2.CH_2.CH_2.CH_2$$
$$|\qquad\qquad\qquad\qquad\qquad\qquad\qquad\quad |$$
$$X\qquad\qquad\qquad\qquad\qquad\qquad\qquad\ X_1$$

Delta delta disubstituted butyl ether

TABLE III
Polyfunctional compounds having the $$\begin{array}{c}-C=C-\\ |\quad\ |\end{array}$$

Linkage

Disubstituted 3 tolyl propene 2

X.CH₂.CH=CH.CH₂.CH₂.X₁

Disubstituted pentene 2

X.CH₂.CH=CH.CH₂.CH₂.CH₂.X₁

Disubstituted hexene 2

X.CH₂.CH₂.CH=CH.CH₂.CH₂.CH₂.X₁

1,7 disubstituted heptene 3

X.CH₂.CH₂.CH=CH.CH₂.CH₂.X₁

1,6 disubstituted hexene 3

H₂C.CH=CH.CH₂
 |        |
 X        X₁

1,4 disubstituted pentene 2

H₂C.CH₂.CH=CH.CH₂.CH.CH₃
 |                  |
 X                  X₁

1,6 disubstituted heptene 3

TABLE IV

Polyfunctional aromatic compounds

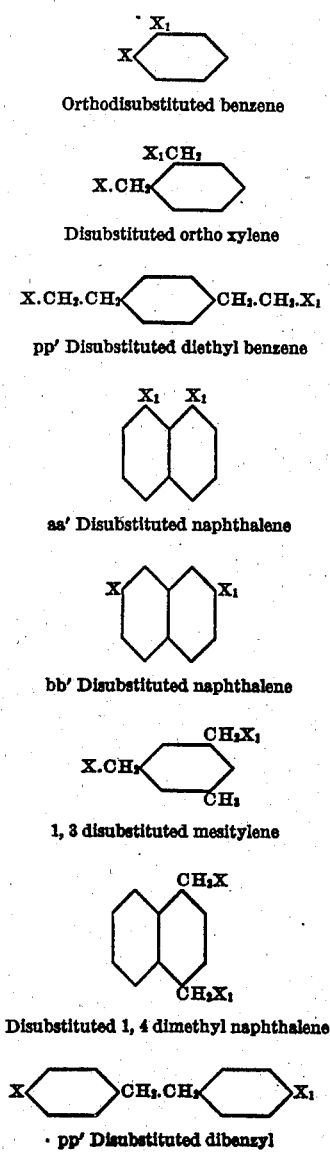

Orthodisubstituted benzene

Disubstituted ortho xylene pp' Disubstituted diethyl benzene aa' Disubstituted naphthalene bb' Disubstituted naphthalene 1, 3 disubstituted mesitylene Disubstituted 1, 4 dimethyl naphthalene pp' Disubstituted dibenzyl

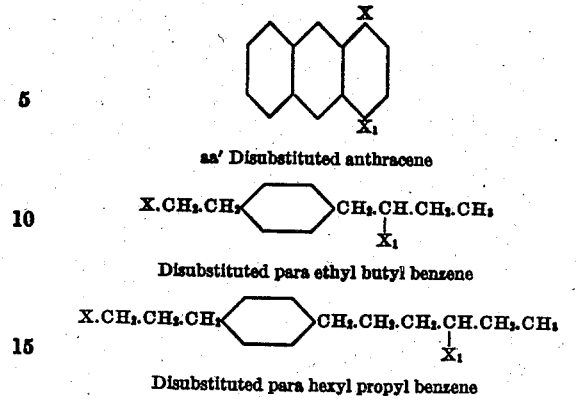

aa' Disubstituted anthracene

Disubstituted para ethyl butyl benzene

Disubstituted para hexyl propyl benzene

There are numerous applications of the principles of the present invention. One of these is in the production of a compound which can be used for the coating of surfaces, for example, storage tanks intended as reservoirs of solvents, chemicals, etc. For this purpose the compound has to meet exacting requirements. It must be substantially insoluble in most solvents and resistant or inert to chemicals of various kinds. Furthermore, it should be substantially infusible or at least possess such a high melting point that it will not unduly soften at temperatures likely to be encountered. In combination with hardness, it must possess such a degree of toughness that it will not crack or chip when the surface to which it is applied is subjected to numerous mechanical operations, such as hammering, drilling, etc. The quality of insolubility precludes the application of the material in the form of a solution or varnish. It should be capable of subdivision to an extent sufficient to enable it to be dispersed in the form of a dust, the dispersing agent in this case being a heated gas. An apparatus which may be used for the application of such gaseous dispersion is set forth in U. S. Patent 1,781,603 to F. Schori. This patent is directed to the dispersion of finely divided metals. Briefly, this apparatus comprises a housing containing chambers in which air and combustible gas are mixed. Into this housing a mixture of finely divided metals and air is fed separately from the air and combustible gas. The housing is provided with a nozzle from which the mixture of combustible gas and air emerges as a flame. A mixture of powdered metal and air is mixed with the combustible gas and air. The latter form a body of heated gas in which the metal is dispersed and softened. This dispersion is directed onto the surface which it is desired to coat. The finely divided metal coalesces on striking the surface and forms a coating. The material of the present invention can be used in the apparatus described instead of metal and in other types of apparatus in which the material of this invention may be dispersed in a heated gas. When so applied the material of this invention can be used to form on a surface an adherent coating of organic polymeric material having the qualities above described.

The said material of the present invention also has numerous applications in the molding arts, wherein the material is subjected to heat and pressure to form a molded article possessing the resistant and durable qualities mentioned. For example, in the process of injection molding, a molding powder is required, which, under the application of heat and pressure, will soften to an extent sufficient to permit its injection into molds.

The preparation of material possessing the above mentioned qualities will be specifically described as follows:

EXAMPLE 7

(In this case the method employed is that listed under C above.)

Take 2½ mols of sodium tetrasulphide in the form of 1250 cubic centimeters of a two molar solution. To this solution is added a dispersing agent produced as follows:

8 grams of sodium hydroxide are dissolved in a liquid followed by 40 cubic centimeters of a 50% solution of magnesium chloride, which forms a dispersion of magnesium hydroxide in the polysulphide solution. The apparatus in which the reaction is carried out is equipped with a suitable stirring arrangement, thermometer and reflux condenser. 1.9 mols (188 grams) of ethylene dichloride and 0.1 mol (14.3 grams) of BB' dichlorethyl ether are mixed together, thereby giving two mols of total organic chloride. The polysulphide dispersion mixture is heated, preferably to a temperature of about 140° F., then with agitation of the polysulphide solution the mixture of organic chloride is added slowly at such a rate that about one hour is taken to add the organic chloride mixture.

The temperature of the mix which rises as a result of this reaction is so controlled that it does not go above about 180° F. during the addition of the mixture of organic chlorides. After the dichloride mixture has all been added to the reaction, the temperature is increased to about 210° F. and the agitation is continued at this temperature for about 2 hours to complete the reaction.

The reaction product so produced is in the form of a dispersion, somewhat resembling rubber latex in its appearance. The agitation is discontinued and the finely divided dispersed particles are allowed to settle to the bottom of the vessel, thereby separating themselves from the spent reaction liquid. The spent liquid from the reaction, that is to say, the supernatant liquid in this case, is removed by any suitable means, such as siphoning decantation, etc., and the latex may be further purified by adding clean water, redispersing the finely divided particles therein and again allowing them to settle out, whereupon the water can be removed, thereby removing the water soluble salts, which are by-products of this reaction.

The organic polymer formed as above stated is an organic polysulphide, having substantially the formula $$[C_2H_4.S_4]_m\text{---}[C_2H_4.O.C_2H_4.S_4]_n$$

the ratio of $m$ to $n$ being about 1.9 to 0.1. Reference to my application 168,522, filed October 11, 1937, and 218,874, filed July 12, 1938, will show that a portion of the sulphur in the above formula is in the labile condition and the remainder in firmly bound condition and that the labile sulphur can be removed by the use of a desulphurizing agent, e. g., alkaline hydroxides, sulphides, sulphites, etc., and in the present example the mixed polymer is partially desulphurized as follows:

To the suspension of the polymer in water there may be added 2½ mols (100 grams) of sodium hydroxide. Agitation of the suspension is started and the mixture is heated to a temperature of about 210° F. and the agitation and heating is continued over a period of about one hour. Agitation is discontinued and the finely divided polymer is permitted to settle out of the liquid. The suspension is then washed or separated from water soluble impurities, as outlined above, after which purification it can be washed with a little acid to remove vestiges of the dispersing agent (magnesium hydroxide) and the polymer may be isolated by any suitable means; for example it can be separated by pressure filtration, then the pressed cake so obtained dried at somewhat elevated temperature.

The product formed by this method when dry is a fine white powder having substantially the formula $$[C_2H_4.S_2]_m\text{---}[C_2H_4.O.C_2H_4.S_2]_n$$

the ratio of $m$ to $n$ being about 1.9 to 0.1. Such a copolymer has properties substantially different from those obtained by first making a polymer by reacting alkaline polysulphide with ethylene dichloride, then making another polymer by reacting an alkaline polysulphide with BB' dichlorethyl ether and then merely physically mixing the polymers thus produced, and said copolymer has properties which are particularly suited for use in the method of the present invention. For example, if a polymer be made having substantially the formula $[C_2H_4S_2]_n$ made, for example, by reaction of an alkaline polysulphide with ethylene dichloride, followed by reaction of said polymer with a desulphurizing agent, that is, one capable of removing labile sulphur from the polysulphide polymer, the product is a harsh, granular powder which, when softened by heat, produces a substance of a resinous nature which has a high degree of hardness and resistance to solvents, but which is brittle and easily fractured. When such a substance is applied as a coating, according to the methods of the present invention, it lacks durability. For example, such a coating develops cracks when the surface with the coating thereon is subjected to the usual or customary operation of drilling, etc. The advantage of producing and utilizing a copolymer can readily be seen because such a mixed polymer, while possessing desirable properties, such as hardness and resistance to solvents, also possesses resistance to shock and toughness. For example, the mixed copolymer in massive form is not only hard but can be subjected to heavy blows and shocks without rupturing and, when applied as a coating, according to the present invention, the resulting composite article can be subjected to all of the customary mechanical operations incident thereto without injury to the coating or separation of the coating from its subjacent structure.

According to the present invention, it is an object to chemically temper a hard and brittle polymer by chemical combination with another polymer, the chief characteristic of which is the property of elongation or extensibility, combined also with elasticity. The resulting compound can therefore be expressed by the formula $$[(RS_2)_m\text{---}(R'S_2)_n]$$

The formula $(RS_2)_m$ has per se the outstanding quality of hardness but is lacking in elongation and is brittle. The polymer $(R'S_2)_n$ has as its outstanding property elongation. When these polymers are chemically combined to produce the mixed polymer herein described, the resulting mixed polymer is a combination of hardness and toughness and therefore possesses the properties which make it particularly adapted for the production of the coating of the present invention and also the method by which such coating is applied.

The species of compounds that produce the hard brittle polymers do not necessarily belong to the same chemical class or genus and the same is true of the compounds producing the extensible polymer. It is therefore necessary to employ functional language in defining the mixed polymer. This will be appreciated when it is noted that the hard brittle polymer may be produced from compounds having the formula X (CH$_2$)$_{1 \text{ to } 6}$X$_1$, whereas compounds of the formula X (CH$_2$)$_{7 \text{ to } 20}$X$_1$ produce polymers of the extensible type. Here we have different homologues in the same series producing polymers different in kind as to properties. In other words, not only may members of different classes produce polymers having the same or similar properties but, conversely, members of the same class may produce polymers having different properties.

For example, whereas 1,3 disubstituted propane produces the hard brittle type of polymer, 1,2 disubstituted propane produces the extensible type. Thus it is impossible to avoid functional language entirely in describing and claiming this aspect of the invention and a mixed or copolymer embodying the present invention may be described as one having the formula $$[(RS_2)_m—(R'S_2)_n]$$

where (RS$_2$)$_m$ is a polymer which per se is substantially hard and brittle and (R'S$_2$) is a polymer which per se is substantially extensible. This functional language is not indefinite because the limits and scope of the invention will be made clear by providing a sufficient number of examples of compounds which produce the respective polymers.

A. *Compounds producing the hard, brittle (RS$_2$) type of polymer.*—Any of the compounds listed in Tables V and VI below may be substituted for the ethylene dichloride (using equivalent molecular amounts) of Example 7. These compounds produce, per se, a hard brittle disulphide polymer.

TABLE V

X.CH$_2$.X$_1$ 1,1 disubstituted methane

X.CH$_2$.CH$_2$.X$_1$ 1,2 disubstituted ethane

X.C$_3$H$_6$.X$_1$ 1,3 disubstituted propane

X.C$_4$H$_8$.X$_1$ 1,4 disubstituted butane

X.C$_5$H$_{10}$.X$_1$ 1,5 disubstituted pentane

X.(CH$_2$)$_6$.X$_1$ 1,6 disubstituted hexane

1,1,2 trisubstituted ethane

1,2,3 trisubstituted propane

Trisubstituted isobutane

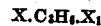

1,2,4 trisubstituted n-butane

1,2,3,4 tetra substituted n-butane

It will be noted that in the above list of compounds the maximum length of the carbon chain is represented by compounds having six carbon atoms. It is desirable to stay within this limit because experience has shown that if this limit is increased the polymers produced tend to acquire extensibility as contrasted with the property of hardness which is desired. In fact, polymers of the extensible (R'S$_2$) type may be produced from compounds having the formulae X (CH$_2$)$_{7 \text{ to } 20}$X$_1$ as shown below in Table VIII, thus demonstrating that different homologues of the same series produce polymers some of which are hard and brittle and others which are extensible.

TABLE VI

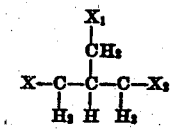

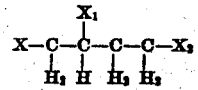

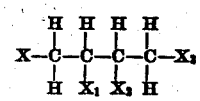

Disubstituted benzenes

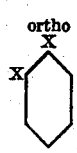 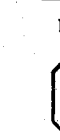 

Disubstituted dimethyl benzene

  

Disubstituted diethyl benzene

  

Disubstituted dipropyl benzene

All of the above disubstituted compounds produce, when reacted alone with an alkaline polysulphide, a disulphide polymer having the characteristics desired, that is to say, hardness and brittleness, and all such polymers can be classified by the general formula (RS$_2$)$_n$, where such polymer, per se, possesses hardness and brittleness.

B. *Compounds producing the extensible (R'S₂) type of polymer.*—Any of the compounds listed in Tables VII, VIII and IX below can be substituted for the BB' disubstituted ethyl ether of Example 7 above.

TABLE VII $$CH_3.CHX.O.CHX_1.CH_3.$$
AA' disubstituted ethyl ether $$X.C_2H_4.O.C_2H_4.X_1.$$
BB' disubstituted ethyl ether $$X.CH_2.O.CH_2.X_1.$$
Disubstituted methyl ether $$X.C_2H_4.O.C_2H_4.O.C_2H_4.X_1.$$
Disubstituted ethoxy ethyl ether $$X.C_2H_4.S.C_2H_4.X_1.$$
Disubstituted thio ethyl ether $$X.CH_2.S.CH_2.X_1$$
Disubstituted thio methyl ether $$X.CH_2.O.CH_2.\overset{CH_3}{\underset{CH_3}{C}}.CH_2.OCH_2.X_1.$$
Disubstituted 1,3 methoxy, 2,2 dimethyl propane $$X.CH_2.CH_2.CH_2.O.CH_2.O.CH_2.CH_2.CH_2.X_1.$$
Disubstituted dipropyl formal $$X.CH_2.CH_2.O.CH_2.O.CH_2.CH_2.X_1$$
Disubstituted diethyl formal $$X.CH_2.O.CH_2.\underset{X_1}{CH}.OCH_3.$$
Disubstituted dimethoxy ethane $$X.CH_2.CH_2.O-\bigcirc-O.CH_2.CH_2.X_1.$$
Disubstituted para diethoxy benzene $$X.CH_2.O.CH_2.CH_2.OCH_2.X_1.$$
Disubstituted dimethoxy ethane $$X.CH_2.CH_2.CH_2.S.CH_2.CH_2.CH_2.X_1.$$
Disubstituted dipropyl thio ether $$X-\bigcirc-O-\bigcirc-X_1.$$
pp' Disubstituted diphenyl ether $$X-\bigcirc-O-CH_3X_1.$$
Disubstituted anisole $$X-\bigcirc-CH_2.O.CH_2-\bigcirc-X_1.$$
Disubstituted dibenzyl ether $$\underset{X}{\bigcirc}-O-\underset{X_1}{\bigcirc}$$
aa' Disubstituted diphenyl eth $$X-\bigcirc-CH_2.O.CH_2-\bigcirc-CH_2.CH.CH_3$$
                                    |
                                    X₁
Disubstituted para propyl dibenzyl ether $$X.CH_2.CH_2.SO_2.CH_2.CH_2.X_1$$
Disubstituted diethyl sulphone $$X.CH_2.CH_2.CH_2.SO_2.CH_2.CH_2.CH_2.X_1.$$
Disubstituted dipropyl sulphone $$CH_2.O.CH.CH_2.O.CH_2.CH_2.O.CH_2.CH_2.O.CH_2.CH.O.CH_2.$$
                                                                |
                                                                X₁
Disubstituted dimethoxy tetra ethylene glycol $$CH_3.CH_2.CH.O.CH.CH_2.CH_3.$$
       |        |
       X        X₁
AA' disubstituted propyl ether $$CH_3.CH_2.CH_2.O.CH_2.CH_2.CH_3.$$
   |                            |
   X                            X₁
Gamma gamma disubstituted propyl ether $$CH_3.CH.CH_2.O.CH_2.CH.CH_3.$$
     |              |
     X              X₁
BB' disubstituted propyl ether $$CH_3.CH.CH.O.CH.CH.CH_3.$$
     |    |        |   |
     X    X₁       ...
Alpha beta disubstituted propyl ether $$CH_3.CH_2.CH_2.O.CH.CH_2.CH_3.$$
   |                  |
   X                  X₁
Alpha gamma disubstituted propyl ether $$CH_3.CH_2.CH_2.CH.O.CH.CH_2.CH_2.CH_3.$$
                 |     |
                 X     X₁
Alpha alpha disubstituted butyl ether $$CH_3.CH_2.CH.CH_2.O.CH_2.CH.CH_2.CH_3$$
        |                      |
        X                      X₁
Beta beta disubstituted butyl ether $$CH_3.CH.CH_2.CH_2.O.CH_2.CH_2.CH.CH_3.$$
     |                              |
     X                              X₁
Gamma gamma disubstituted butyl ether $$CH_2.CH_2.CH_2.CH_2.O.CH_2.CH_2.CH_2.CH_2.$$
 |                                        |
 X                                        X₁
Delta delta disubstituted butyl ether $$X.CH_2.CH=CH-\bigcirc-CH_2.X_1.$$
Disubstituted 3 tolyl propene 2

$$X.CH_2.CH=CH.CH_2.CH_2.X_1.$$
Disubstituted pentene 2

$$X.CH_2.CH=CH.CH_2.CH_2.CH_2.X_1.$$
Disubstituted hexene 2

$$X.CH_2.CH_2.CH=CH.CH_2.CH_2.CH_2.X_1.$$
1,7 disubstituted heptene 3

$$X.CH_2.CH_2.CH=CH.CH_2.CH_2.X_1.$$
1,6 disubstituted hexene 3

$$H_3C.CH.CH=CH.CH.CH_3.$$
     |           |
     X           X₁
1,4 disubstituted pentene 2

$$H_3C.CH_2.CH=CH.CH_2.CH.CH_3.$$
       |                  |
       X                  X₁
1,6 disubstituted heptene 3

All of the above compounds have two carbon atoms separated by and joined to intervening structure characterized by ether linkage or the grouping $$-\underset{|}{C}=\underset{|}{C}-$$

and all of these compounds produce polymers which, per se, have not only elasticity but also elongation as an outstanding characteristic thereof. Such properties can, for the purposes of the present invention, be obtained not only from the compounds in the above list but also from those in the following list, and it will be noted that these compounds are similar to those above described in Table I, with the distinction that the length of the carbon chain is greater than 6 carbon atoms:

TABLE VIII

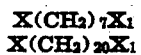

However, the length of the carbon chain is not, per se, the sole determinant in selecting compounds which will provide the (R'S)₂ type of polymer, because compounds such as illustrated below in Table IX can be employed instead of those listed in Tables III and IV.

TABLE IX

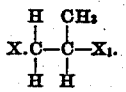

1,2 disubstituted propane

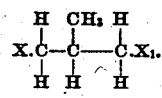

1,3 disubstituted, 2 methyl propane

A lack of distinction between the properties to be obtained from 1,2 disubstituted propane in the above Table IX and, for example, 1,3 disubstituted propane in Table I, would normally be expected because of the fact that each of these compounds has three carbon atoms and two substituents. The fact is, however, that 1,2 dichlor propane (propylene dichloride) reacts to give a disulfide polymer having distinct properties of elongation, whereas when 1,3 disubstituted propane is reacted to produce a disulphide polymer, the latter is hard and resinous and lacking in properties of elongation. There is, however, a definite theory to account for this non-obvious difference in the facts. In the 1,3 disubstituted trimethylene the carbon atoms are in a substantially straight line and the polymer produced therefrom is likewise a straight chain polymer, the shape of which is substantially that of a rod. The aggregations of these polymers are hard and resinous because it can readily be inferred that the infinite number of such rods can be closely packed together to form a compact, hard mass. In the case of 1,2 disubstituted propane, however, the reaction, e. g., with alkaline polysulphide, occurs at the carbon atoms placed at the 1,2 carbon positions and the polymer chain grows from these positions. This necessarily means that the methyl group forms a multitude of side chains or side arms in the resulting polymer. Consequently, these side arms or methyl groups act substantially as spacing elements which prevent the polymers from being compacted closely together. The molecular structure is therefore looser and this satisfactorily accounts for the fact that such a polymer has properties of elongation.

Likewise, it would normally be thought that 1,2 dichlor propane, shown above in Table IX, would give a polymer having substantially the same properties as 1,2,3 trichlor propane, illustrated in Table I above, in view of the fact that both of these compounds have replaceable substituents on the 1,2 carbon atoms. The fact, however, is that 1,2 dichlor propane reacted with an alkaline polysulphide and subsequently desulphurized to the disulphide condition produces a polymer having properties of elongation, whereas 1,2,3 trichlor propane reacted in the same manner produces a polymer in which no such elongation is observed. The theory which explains these differences in the facts is this: In the 1,2,3 trichlor propane it is true that there are replaceable substituents in the 1,2 position and that in part the resulting polymer grows from these two positions. It is also true that in the 1,2,3 trichlor propane there is a methyl group attached to the carbon atom in the 2-position, which might lead to the conclusion that this would form a spacing element similar to the methyl group similarly positioned in 1,2 dichlor propane, shown in Table IX, but it will be noted that the methyl group in 1,2,3 trichlor propane shown in Table I has a replaceable substituent thereon, which reacts with the polysulphide and produces cross connecting polymers so that the said substituted methyl group, rather than forming the spacing element actually results in bridge formation between the polymeric chains, with the result that the resulting polymer is substantially a series of long rods, it is true, spaced apart but nevertheless connected together and rigidified by means of numerous bridges, giving it the same, or possibly more, rigidity than would be the case if the polymer were simply a series of rods compacted together.

It will therefore be clear that when it is desired to apply the principles of this invention to the production of a polymer having a combination of hardness and toughness I may proceed by combining a polymer produced from a compound selected from group A with a polymer selected from group B, i. e., I may effect substantially the following reaction:

—(RS₂)—+—(R'S₂)—=[(RS₂)—(R'S₂)]

The specific mechanism by which this combination may be effected is subject to considerable variation. In Example 7 is shown a process whereby a mixture of compounds, such as XRX₁ and XR'X₁ are reacted with an alkaline polysulphide (where X and X₁ are substituents attached, respectively, to the same or different carbon atoms and capable of being split off during the reaction with the polysulphide) and the resulting mixed polymer is partially desulphurized by reaction with a desulphurizing reagent (method C, above, with partial desulphurization). Instead of this specific method I may use any of the methods A to H, employing desulphurization where necessary, to produce the disulphide type polymer.

All of the polymers produced as above described are in a form capable of being cured, i. e., they are in a potentially reactive or intermediate form. They may be marketed in this form and then cured by the buyer who for this purpose may make a compound as follows:

| | Parts by weight |
|---|---|
| Intermediate polymer | 100.00 |
| Zinc oxide | 10.00 |
| Carbon black | 20.00 |
| Stearic acid | 0.05 |
| Benzo thiazyl disulphide | 0.25 |

These ingredients are thoroughly mixed, e. g., by mastication and the mixture or compound then heated to about 300° F. for about one hour to cause the curing reaction to occur. Thereby the ultimate properties are developed.

Instead of zinc oxide, numerous other metallic oxides and inorganic and organic oxidizing agents may be employed, e. g., oxides of copper, lead, bismuth, antimony, arsenic, manganese and chromium, benzoyl peroxide and organic mono and polynitro compounds.

Instead of benzo thiazyl disulphide, other compounds may be used known as "vulcanization accelerators."

In the production of the hard, tough compound for coating surfaces by reacting a hard brittle disulphide polymer with an extensible disulphide polymer, curing may be dispensed with because the properties of the resulting copolymer are such that curing may not be necessary in order to adapt it to this particular purpose.

Copolymers of the monosulphide type

The previous discussion has been concerned primarily with the case where each of the polymeric constituents or components of the copolymer is of the polysulphide type, i. e., of the type having the general formula $(RS_{2 \text{ to } 6})$ formed by reaction between a polyfunctional organic compound and an alkaline di, tri, tetra, penta or hexasulphide, or by other means, as herein disclosed. It is possible, however, for one or all of the said polymeric components to be of the monosulphide type, that is, a polymer of the unit (RS). Such a polymer may be obtained by a reaction between a poly or bifunctional organic compound and an alkaline monosulphide. In the reaction between an alkaline monosulphide and a bi or polyfunctional compound the general mechanism is similar to that shown by the reactions of the accompanying drawing. In the resulting polymer the organic radicals are separated by a single sulphur atom instead of a pair of said sulphur atoms. Illustrative methods of producing copolymers where one or both of the polymeric components is of the monosulphide type are illustrated by the following examples:

EXAMPLE 8

In this example the bifunctional compound, e. g., BB' dichlorethyl ether is reacted with an alkaline tetrasulphide to give a tetrasulphide organic polymer, which is then stripped or reduced down to the disulphide form. Another polymer is separately made by reacting ethylene dichloride with sodium monosulphide. Both polymers are prepared in the form of latex-like dispersions and these polymers are then mixed and reacted. The general formula of the resulting copolymer is

$[C_2H_4.O.C_2H_4.S_2]_m$—$[C_2H_4S]_n$

The ratio of $m$ to $n$ is readily controlled by selecting predetermined molecular ratios of the BB' dichlor ethyl ether and of the ethylene dichloride, respectively. Specific details of this example follow:

4 mols of sodium tetrasulphide in the form of 2000 cubic centimeters of a two molar solution are placed in a flask equipped with mechanical agitator, thermometer and reflux condenser. To this are added 10 grams of sodium hydroxide and 25 grams of $MgCl_2.6H_2O$ to form a colloidal dispersion of magnesium hydroxide. The temperature of the mix is adjusted to about 140° F. and 3 mols of BB' dichloroethyl ether (430 grams) are added over a period of aout one hour, the temperature being controlled in such a manner that the heat of the reaction does not cause the temperature of the mix to go above about 180° F. After all of the dichloro ether is in the mix the temperature is raised to 210° F. and held there for another 30 minutes, after which the agitator is stopped and the condensation polymer which is in the form of a finely divided latex-like product is permitted to settle out.

The supernatant residual polysulphide solution is removed and the latex is washed twice by agitation with warm water and allowed to settle out with removal of supernatant liquid each time. The latex is then treated with 2½ mols of sodium monosulphide for the purpose of partially "stripping" the tetrasulphide polymer to a lower sulphur rank. The latex is heated with the "stripping" agent to 140° F. for one hour with constant agitation, the temperature being kept as low as possible in order to keep the condensation polymer in a low state of polymerization.

The partially "stripped" latex is allowed to separate out of the polysulphide solution formed by this process and the polysulphide solution is removed as above and the latex is washed as described before.

The formation of the other component of the copolymer is effected as follows:

1½ mols of sodium monosulphide in the form of 750 cubic centimeters of a two molar solution are placed in the same type of flask as described above and 10 grams of sodium hyroxide are added thereto followed by 25 grams $MgCl_2.6H_2O$. This mixture is heated to 160° F. and 1 mol of ethylene dichloride is added dropwise to the mechanically agitated mixture. The temperature is so controlled that it does not go above about 170° F. during the addition of the ethylene dichloride. The addition of the ethylene dichloride is continued for a period of about one hour, after which the temperature of the mixture is raised to 200° F. for about 15 minutes. The agitator is stopped and the latex-like dispersion of the condensation polymer is allowed to settle out. The supernatant liquid is removed and the latex is added to the one derived from BB' dichloro ether, the preparation of which was described above.

In view of the fact that neither of these latices have been subjected to any considerable amount of heat the respective polymers therein are in a low state of polymerization, i. e., the molecular weight is comparatively low at the time they are mixed. They are mixed thoroughly by mechanical agitation and treated with ½ mol of sodium monosulphide while the temperature is gradually raised to 212° F. This temperature is continued with agitation for a period of about one hour.

Sufficient combined labile sulphur was left in the ether polymer first formed after the partial "stripping" given it to form a polysulphide solution with the addition of the sodium monosulphide last added. The effect of the polysulphide so formed in combination with the time and temperature involved causes a very considerable amount of condensation to occur between the mercaptide (—SNa) terminals of the respective polymers. The copolymer so formed which is in a latex-like state may now, if desired, be acidified by the addition of acid until the pH is brought to between 4 and 5, whereupon coagulation takes place and the copolymer is obtained in the massive form. This treatment produces a rubber-like mass which can be washed with water to remove traces of acid and masticated on a rubber mill until dry.

In Example 8, the "stripping" step, i. e., removal of labile sulphur or partial desulphurization may be omitted and the resulting tetrasulphide organic polymer may then be reacted with the polymer formed by the alkaline monosulphide reaction so that the formula of the resulting copolymer is substantially $$[C_2H_4.O.C_2H_4.S_4]_m-[C_2H_4S]_n$$

Both of the polymeric components of the copolymer may if desired be of the monosulphide type and the production of a polymer of this type will be described in the following example:

EXAMPLE 9

In this example a mixture of bifunctional organic compounds is reacted with an alkaline monosulphide with the result that a copolymer is formed, both of the polymeric components of which are organic monosulphide polymers. This will be specifically illustrated as follows:

4½ mols of sodium monosulphide in the form of 2250 cc. of a two molar solution are placed in a flask equipped with a mechanical agitator, reflux condenser and thermometer. 10 grams of caustic soda are added to the solution followed by 25 grams of $MgCl_2.6H_2O$ to form a colloidal dispersion of magnesium hydroxide. A mixture of 2 mols (250 grams) of 1,4 dichloro butene 2 and 2 mols (198 grams) ethylene dichloride are added, dropwise, over a period of about two hours to the monosulphide solution in the flask which is continuously agitated and the temperature of which is maintained at or near 170° F.

After all of the mixture of organic dichlorides has been added the temperature is raised to 212° F. and held at that temperature with agitation for a period of about two hours. About 0.5 mol of sodium tetrasulphide is then added in the form of 250 cc. of a 2 molar solution and the temperature is held at about 212° F. for about 30 minutes. The purpose of adding the alkaline polysulphide is to cause coupling of the polymers. Instead of alkaline polysulphide other coupling agents can be used, e. g., air, oxygen, hypohalites, peroxides, perborates, permanganates, etc. The agitator is then stopped and the latex-like dispersion of the condensation copolymer is allowed to settle out. The supernatant liquid is withdrawn and the finely divided copolymer is repeatedly washed with water until free from water soluble salts.

If it is desired to coagulate the material the latex is acidified to a pH of between 4 and 5, upon which separation in the elastic state takes place.

In the above Examples 8 and 9, instead of the specific bifunctional compounds mentioned therein, any of the specific compounds listed in this application may be substituted in substantially equi-molecular proportions, care being taken to select said compounds so that R and R' have different specific structure. It is to be noted, however, that alkaline monosulphides react with certain compounds having four and five atoms in the chain, particularly where these atoms are connected by primary or single valences only, to form five and six membered rings, respectively, the formation of which reduces the yield of the chain-like polymers and, therefore, from the yield point of view, compounds will preferably be selected by the skilled chemist which do not have said tendency toward ring formation by reaction with alkaline monosulphides.

From the preceding disclosure it will be noted that the general formula of the copolymers of the present invention is $$[(RS_{1\ to\ 6})_m-(R'S_{1\ to\ 6})_n]$$

The previous discussion has been concerned mainly with cases where the copolymer contains only two polymeric components. The invention is not however limited to such two component polymers and embraces cases where more than two polymeric components are present in the final copolymer. For example, three or more bi or polyfunctional compounds of the $XRX_1$ type, for example $XRX_1$, $XR'X_1$ and $XR''X_1$, where R, R' and R'' have different specific structure, may be reacted with an alkaline polysulphide to produce a copolymer having substantially the structure.

$$[(RS_{1\ to\ 6})_m-(R'S_{1\ to\ 6})_n-(R''S_{1\ to\ 6})_p]$$

In Example 9, the organic compounds may be reacted successively with the alkaline monosulphide in the same vessel as in Example 1 or separately reacted as in Example 3, the resulting polymers being coupled by a suitable oxidizing treatment in each case.

Commercially it is of great advantage to produce a polymer having all desired qualities from a compound $XRX_1$ where R is a radical having the skeleton structure

representing adjacent carbon atoms and X and $X_1$ represent the means for polymerizing the $XRX_1$ compound e. g. substituents which are split off in the alkaline polysulphide reaction or —SH groups or —$S_2O_3H$ groups. Such an $XRX_1$ compound is exemplified by the relatively cheap ethylene dichloride. The highest degree of success in obtaining a satisfactory "synthetic rubber" demands a combination of cheapness with desirable properties. Ethylene dichloride may be and is made from hydrocarbons and chlorine and chlorine is made from salt. Sodium polysulphide is made from sulphur and sodium and the latter from salt. Consequently the ethylene dichloride type of polymer may be made from hydrocarbons and salt. Unfortunately the polymer of the general formula

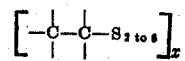

does not possess all the desired qualities. In accordance with the present invention, these qualities are greatly improved by chemically combining a polymer of the above formula with one of the formula

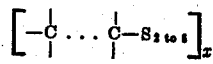

where

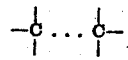

represents carbon atoms separated by intervening structure.

It has now been found that if a polymer having the general formula

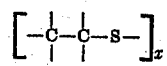

is produced, e. g., by reacting ethylene dichloride with an alkaline monosulphide and this polymer is combined with a polymer of the general formula

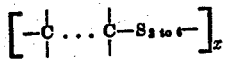

where

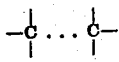

represents carbon atoms separated by intervening structure, then a still further approach to the ideal combination of cheapness plus desirable qualities is obtained. The polymer of the unit

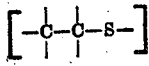

does not per se possess all desired properties. However it is cheap and when it is combined with a polymer of the unit

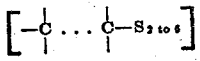

there is produced a copolymer possessing a combination of relative cheapness and desirable properties and thus at least an approach to the ideal synthetic rubber is obtained.

The resulting copolymer has the general formula

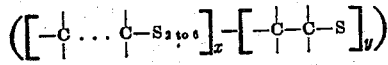

I claim:

1. The process which comprises reacting a polymer of the unit $(RS_{1\ to\ 6})$ with a polymer of the unit $(R'S_{1\ to\ 6})$, R and R' being radicals selected from the groups

(representing carbon atoms separated by intervening structure) and

(representing adjacent carbon atoms), S being a sulphur atom and R and R' having different specific structure.

2. The process which comprises reacting a polymer of the unit $(RS_{2\ to\ 6})$ with a polymer of the unit $(R'S_{2\ to\ 6})$, R and R' being radicals selected from the groups

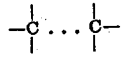

(representing carbon atoms separated by intervening structure) and

(representing adjacent carbon atoms), S being a sulphur atom and R and R' having different specific structure.

3. The process which comprises reacting a polymer of the unit $(RS_2)$, which polymer is per se hard and brittle, with a polymer of the unit $(R'S_2)$, which polymer is substantially extensible, where R and R' are radicals having skeleton structure selected from the groups

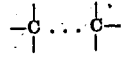

(representing carbon atoms separated by intervening structure) and

(representing adjacent carbon atoms), S is a sulphur atom and R and R' have different specific structure.

4. The process which comprises reacting a plurality of compounds having the general formula $XRX_1$ with an alkaline polysulphide, X and $X_1$ being substituents attached to each of two different carbon atoms and R being a radical having skeleton structure selected from the groups consisting of

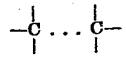

(representing carbon atoms joined to and separated by intervening structure) and

(representing adjacent carbon atoms), the radicals R in the respective compounds having different specific structure whereby a plurality of polymers is obtained and reacting said polymers to cause chemical combination thereof.

5. The product which is substantially identical with that obtained by reacting a plurality of compounds having the general formula $XRX_1$ with an alkaline polysulphide, X and $X_1$ being substituents attached to each of two different carbon atoms and R being a radical having skeleton structure selected from the groups consisting of

(representing carbon atoms joined to and separated by intervening structure) and

(representing adjacent carbon atoms), the radicals R in the respective compounds having different specific structure whereby a plurality of polymers is obtained and reacting said polymers to cause chemical combination thereof.

6. The process which comprises reacting with an alkaline polysulphide a compound having two carbon atoms to each of which is joined a substituent which is split off during the reaction, said carbon atoms being joined to and separated by intervening structure, and a compound having two adjacent carbon atoms to each of which is attached a substituent which is split off during the reaction, whereby polymers having different properties are formed, and reacting said polymers.

7. The product which is substantially identical with that obtained by reacting with an alkaline polysulphide a compound having two carbon atoms to each of which is joined a substituent which is split off during the reaction, said carbon atoms being joined to and separated by intervening structure, and a compound having two adjacent carbon atoms to each of which is attached a substituent which is split off during the reaction, whereby polymers having different properties are formed, and reacting said polymers.

8. The process which comprises reacting with an alkaline polysulphide a compound having two carbon atoms to each of which is joined a substituent which is split off during the reaction, said carbon atoms being joined to and separated by intervening structure characterized by an ether linkage, and a compound having two adjacent carbon atoms to each of which is attached a substituent which is split off during the reaction, whereby polymers having different properties are formed, and reacting said polymers.

9. The product which is substantially identical with that obtained by reacting with an alkaline polysulphide a compound having two carbon atoms to each of which is joined a substituent which is split off during the reaction, said carbon atoms being joined to and separated by intervening structure characterized by an ether linkage, and a compound having two adjacent carbon atoms to each of which is attached a substituent which is split off during the reaction, whereby polymers having different properties are formed, and reacting said polymers.

10. The process which comprises reacting with an alkaline polysulphide an ether having two terminal carbon atoms to each of which is joined a substituent which is split off during the reaction, and a compound having two adjacent carbon atoms to each of which is attached a substituent which is split off during the reaction whereby polymers having different properties are formed, and reacting said polymers.

11. The product which is substantially identical with that obtained by reacting with an alkaline polysulphide an ether having two terminal carbon atoms to each of which is joined a substituent which is split off during the reaction, and a compound having two adjacent carbon atoms to each of which is attached a substituent which is split off during the reaction whereby polymers having different properties are formed, and reacting said polymers.

12. The process which comprises reacting with an alkaline polysulphide BB' dichlorethyl ether and ethylene dichloride, whereby polymers having different properties are formed and reacting said polymers.

13. The product which is substantially identical with that obtained by reacting with an alkaline polysulphide BB' dichlorethyl ether and ethylene dichloride, whereby polymers having different properties are formed and reacting said polymers.

14. The process which comprises reacting with an alkaline polysulphide a compound having the general formula XRX₁, X and X₁ being substituents attached to each of two different carbon atoms which substituents are split off during the reaction and R being a radical having skeleton structure selected from the groups consisting of

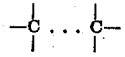

(representing carbon atoms joined to and separated by intervening structure) and

(representing adjacent carbon atoms) whereby a polymer is formed, reacting said polymer with a desulphurizing agent which removes a portion of the combined sulphur from said polymer and is thereby converted into an alkaline polysulphide, and reacting said alkaline polysulphide with a compound having the formula XR'X₁, X and X₁ being substituents split off during the reaction, R' being a radical having skeleton structure selected from the groups

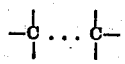

(representing carbon atoms joined to and separated by intervening structure) and

(representing adjacent carbon atoms) and R and R' having different specific structure, whereby a second polymer is formed and reacting said polymers.

15. The product which is substantially identical with that obtained by reacting with an alkaline polysulphide a compound having the general formula XRX₁, X and X₁ being substituents attached to each of two different carbon atoms which substituents are split off during the reaction and R being a radical having skeleton structure selected from the groups consisting of

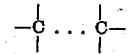

(representing carbon atoms joined to and separated by intervening structure) and

(representing adjacent carbon atoms) whereby a polymer is formed, reacting said polymer with a desulphurizing agent which removes a portion of the combined sulphur from said polymer and is thereby converted into an alkaline polysulphide, and reacting said alkaline polysulphide with a compound having the formula XR'X₁, X and X₁ being substituents split off during the reaction, R' being a radical having skeleton structure selected from the groups

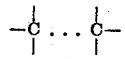

(representing carbon atoms joined to and separated by intervening structure) and

(representing adjacent carbon atoms) and R and R' having different specific structure, whereby a second polymer is formed and reacting said polymers.

16. The process which comprises reacting with an alkaline polysulphide a compound having the general formula XRX₁, X and X₁ being substituents attached to each of two different carbon atoms, which substituents are split off during the reaction, and R being a radical having skeleton structure selected from the groups consisting of

(representing carbon atoms joined to and separated by intervening structure characterized by an ether linkage) and

(representing adjacent carbon atoms) whereby a polymer is formed, reacting said polymer with a desulphurizing agent which removes a portion of the combined sulphur from said polymer and is thereby converted into an alkaline polysulphide, and reacting said alkaline polysulphide with a compound having the formula XR'X₁, X and X₁ being substituents split off during the reaction, R' being a radical having skeleton structure selected from the groups

(representing carbon atoms joined to and separated by intervening structure characterized by an ether linkage) and

(representing adjacent carbon atoms), and R and R' having different specific structure, whereby a second polymer is formed and reacting said polymers.

17. The product which is substantially identical with that obtained by reacting with an alkaline polysulphide a compound having the general formula $XRX_1$, X and $X_1$ being substituents attached to each of two different carbon atoms, which substituents are split off during the reaction, and R being a radical having skeleton structure selected from the groups consisting of

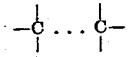

(representing carbon atoms joined to and separated by intervening structure characterized by an ether linkage) and

(representing adjacent carbon atoms) whereby a polymer is formed, reacting said polymer with a desulphurizing agent which removes a portion of the combined sulphur from said polymer and is thereby converted into an alkaline polysulphide, and reacting said alkaline polysulphide with a compound having the formula $XR'X_1$, X and $X_1$ being substituents split off during the reaction, R' being a radical having skeleton structure selected from the groups

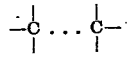

(representing carbon atoms joined to and separated by intervening structure characterized by an ether linkage) and

(representing adjacent carbon atoms), and R and R' having different specific structure, whereby a second polymer is formed and reacting said polymers.

18. The process which comprises reacting with an alkaline polysulphide an ether having the general formula $XRX_1$, X and $X_1$ being substituents attached to each of the two terminal carbon atoms of said ether, which substituents are split off during the reaction, whereby a polymer is formed, reacting said polymer with a desulphurizing agent which removes a portion of the combined sulphur from the said polymer and is thereby converted into an alkaline polysulphide, and reacting said alkaline polysulphide with a compound having the formula $XR'X_1$, X and $X_1$ being substituents split off during the reaction, R' being a radical having skeleton structure selected from the groups

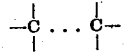

(representing carbon atoms joined to and separated by intervening structure) and

(representing adjacent carbon atoms) and R and R' having different specific structure, whereby a second polymer is formed and reacting said polymers.

19. The product which is substantially identical with that obtained by reacting with an alkaline polysulphide an ether having the general formula $XRX_1$, X and $X_1$ being substituents attached to each of the two terminal carbon atoms of said ether, which substituents are split off during the reaction, whereby a polymer is formed, reacting said polymer with a desulphurizing agent which removes a portion of the combined sulphur from the said polymer and is thereby converted into an alkaline polysulphide, and reacting said alkaline polysulphide with a compound having the formula $XR'X_1$, X and $X_1$ being substituents split off during the reaction, R' being a radical having skeleton structure selected from the groups

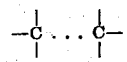

(representing carbon atoms joined to and separated by intervening structure) and

(representing adjacent carbon atoms, and R and R' having different specific structure, whereby a second polymer is formed and reacting said polymers.

20. The process which comprises reacting BB' dichlorethyl ether with an alkaline polysulphide whereby a polymer is formed, reacting said polymer with a desulphurizing agent which removes a portion of the combined sulphur from said polymer and is thereby converted into an alkaline polysulphide, and reacting said alkaline polysulphide with ethylene dichloride whereby a second polymer is formed, and reacting said polymers.

21. The product which is substantially identical with that obtained by reacting BB' dichlorethyl ether with an alkaline polysulphide whereby a polymer is formed, reacting said polymer with a desulphurizing agent which removes a portion of the combined sulphur from said polymer and is thereby converted into an alkaline polysulphide, and reacting said alkaline polysulphide with ethylene dichloride whereby a second polymer is formed, and reacting said polymers.

22. The process which comprises reacting a polymer of the unit $(RS_{2\ to\ 6})$ with a polymer of the unit (R'S), R having the skeleton structure

(representing carbon atoms separated by intervening structure) and R' having the skeleton structure

(representing adjacent carbon atoms), S being a sulphur atom.

23. The process which comprises reacting a polymer of the unit $(C_2H_4.O.C_2H_4S_{2\ to\ 6})$ with a polymer of the unit $(C_2H_4S)$, S being a sulphur atom.

24. The process which comprises reacting with alkaline polysulphide a compound having two carbon atoms to each of which is joined a substituent which is split off during the reaction, said carbon atoms being joined to and separated by intervening structure, whereby a first polymer is obtained, and reacting with an alkaline monosulphide a compound having two adjacent carbon atoms to each of which is attached a substituent which is split off during the reaction whereby a second polymer is obtained, and reacting the first polymer with the second polymer.

25. The process which comprises oxidizing a compound having two carbon atoms to each of which is joined an SH group, said carbon atoms being joined to and separated by intervening structure whereby a first polymer is obtained; and oxidizing a compound having two adjacent carbon atoms, to each of which is attached an SH group whereby a second polymer is obtained, and reacting the first polymer with the second polymer.

26. The process which comprises reacting BB' dichlor ethyl ether with an alkaline polysulphide whereby a first polymer is obtained, and reacting ethylene dichloride with an alkaline polysulphide whereby a second polymer is obtained, and reacting the first polymer with the second polymer.

27. The process which comprises reacting BB' dimercapto ethyl ether with an oxidizing agent, whereby a first polymer is obtained, and reacting dimercapto ethane with an oxidizing agent, whereby a second polymer is obtained, and reacting said polymers.

28. The process which comprises reacting a polymer of the unit (RS₂) with a polymer of the unit (R'S), R being a radical having the skeleton structure

(representing carbon atoms separated by intervening structure) and R' being a radical having the skeleton structure

(representing adjacent carbon atoms), S being a sulphur atom.

29. The process which comprises reacting with an alkaline polysulphide a compound having two carbon atoms to each of which is joined a substituent which is split off during the reaction, said carbon atoms being joined to and separated by intervening structure, and obtaining a sulphurized polymer, reacting said sulphurized polymer with a desulphurizing agent to obtain a partially desulphurized first polymer; reacting an alkaline monosulphide with a compound having two adjacent carbon atoms, to each of which is attached a substituent which is split off during the reaction whereby a second polymer is obtained, and reacting the first polymer with the second polymer.

30. A copolymer which is substantially a chemical combination of a polymer of the unit [RS₁ to ₆] and a polymer of the unit [R'S₁ to ₆], R and R' being radicals having skeleton structure selected from the groups

(representing carbon atoms separated by intervening structure) and

(representing adjacent carbon atoms), S being a sulphur atom and R and R' having different specific structure.

31. A copolymer which is substantially a chemical combination of a polymer of the unit [RS₂ to ₆] and a polymer of the unit [R'S₂ to ₆], R and R' being radicals having skeleton structure selected from the groups

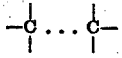

(representing carbon atoms separated by intervening structure) and

(representing adjacent carbon atoms), S being a sulphur atom and R and R' having different specific structure.

32. A copolymer which is substantially a chemical combination of a polymer of the unit [RS₂] and a polymer of the unit [R'S₂] where [RS₂] and [R'S₂] represent polymers of units selected from the groups having the skeleton structures

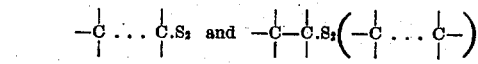

being carbon atoms separated by intervening linkage and

being adjacent carbon atoms, S is a sulphur atom and R and R' are radicals having different specific structure, the polymer of the unit [RS₂] being a polymer which per se is hard and brittle and the polymer of the unit [R'S₂] being a polymer which per se is substantially extensible.

33. A copolymer which is substantially a chemical combination of a polymer of the unit [RS₂ to ₆] and a polymer of the unit [R'S], R being a radical having the skeleton structure

(representing carbon atoms separated by intervening structure) and R' being a radical having the skeleton structure

(representing adjacent carbon atoms), S being a sulphur atom.

34. A copolymer which is substantially a chemical combination of a polymer of the unit [C₂H₄.O.C₂H₄S₂ to ₆] and a polymer of the unit [C₂H₄S], S being a sulphur atom.

35. A copolymer which is substantially a chemical combination of a polymer of the unit [RS₂] and a polymer of the unit [R'S], R being a radical having the skeleton structure

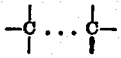

(representing carbon atoms separated by intervening structure) and R' being a radical having the skeleton structure

(representing adjacent carbon atoms), S being a sulphur atom.

JOSEPH C. PATRICK.